United States Patent [19]

Matsumoto

[11] Patent Number: 4,593,524
[45] Date of Patent: Jun. 10, 1986

[54] CONTROL DEVICE FOR A POWER-DRIVEN AIR PUMP FOR A CAR

[75] Inventor: Akio Matsumoto, Hyogo, Japan

[73] Assignee: Mitsubishi Denki Kabushiki Kaisha, Tokyo, Japan

[21] Appl. No.: 655,552

[22] Filed: Sep. 28, 1984

[30] Foreign Application Priority Data

Oct. 24, 1983 [JP] Japan .................. 58-164397[U]

[51] Int. Cl.⁴ .................................. F01N 3/22
[52] U.S. Cl. ............................ 60/289; 417/43
[58] Field of Search .............. 60/289, 290; 417/43, 417/44

[56] References Cited

U.S. PATENT DOCUMENTS

| 1,419,316 | 6/1922 | Sherbondy | 417/43 |
| 2,439,239 | 4/1948 | Crever | 417/43 |
| 2,981,195 | 4/1961 | Payne | 417/44 |
| 3,503,716 | 3/1970 | Berger | 60/289 |
| 4,098,078 | 7/1978 | Laurent | |

FOREIGN PATENT DOCUMENTS

| 2101176 | 8/1971 | Fed. Rep. of Germany |
| 2124623 | 11/1972 | Fed. Rep. of Germany |
| 2326989 | 12/1974 | Fed. Rep. of Germany |

Primary Examiner—Douglas Hart
Attorney, Agent, or Firm—Oblon, Fisher, Spivak, McClelland & Maier

[57] ABSTRACT

A control device for a power-driven pump used for a car comprising a d.c. motor, an air pump driven by the d.c. motor and an exhaust device for reburning and purifying exhaust gas from an engine by actuating the air pump, wherein sensors for detecting quantity of air necessary to be fed into the exhaust device to purify the exhaust gas and a variable control device to variably control the revolution speed of the d.c. motor depending on the quantity of air.

1 Claim, 4 Drawing Figures

CONTROL DEVICE FOR A POWER-DRIVEN AIR PUMP FOR A CAR

The present invention relates to a control device for a power-driven air pump for a car which is driven by a d.c. motor.

FIG. 1 shows a conventional device of this kind. In FIG. 1, a reference numeral 1 designates a power-driven air pump for supplying air in a exhaust system of a car (not shown), a numeral 2 designates a d.c. motor for driving the air pump 1, a numeral 3 designates a power relay for performing start and stoppage of the d.c. motor 2, a numeral 4 designates a control device controlling a field coil of the power relay 3, a numeral 5 designates a group of sensors which input signals into the control device 4, a numeral 6 designates a fuse, a numeral 7 designates a key switch and a numeral 8 designates a battery.

The operation of the conventional device constructed as above-mentioned will be described.

Upon turning on the key switch 7, an engine (not shown) is started. Under the condition, when a signal is input to the control device 4 from the sensors 5 for effecting supply of the secondary air from the air pump 1, the field coil of the power relay 3 is rendered to be in conductive state by the control device 4 to close a contact point of the power relay 3, whereby the d.c. motor 2 is driven to supply air from the air pump 1 to a discharge device (not shown) thereby purifying exhaust gas. When purifying operations have been completed, the contact point of the power relay 3 is opened by the control device 4 to stop the d.c. motor 2 and supply of the secondary air from the air pump 1 is stopped. Thus, the air pump 1 is operated to purify the exhaust gas by the signal from the sensors 5 only when the secondary air is needed.

Description will be made as to the basic characteristic of the air pump, as an example of a multivane type air pump, with reference to FIG. 2. In FIG. 2, the abscissa represents discharge pressure and the ordinate represents flow rate. As apparent from the Figure, as the revolution speed of the d.c. motor becomes high, the flow rate of the air pump becomes high. However, when the revolution speed of the d.c. motor is high as shown in FIG. 3, current flowing in the d.c. motor increases. The capacity of an air pump is customarily so designed that it is about two times a value required under normal condition, in consideration of circumstances of low density of air such as a low atmospheric pressure or high temperature at a highland, and reduction in revolution speed of the d.c. motor due to fluctuation of voltage and deterioration of a pump.

In the conventional control device for a power-driven air pump for a car having the construction as above-mentioned, the air pump is always operated at a high revolution speed, namely with a large amount of current consumed in the d.c. motor regardless of circumstances. Further, when the air pump is operated under condition of a high density of air, excessive air is discharged to cause consumption of useless power, whereby the durability of the air pump as well as the d.c. motor is reduced.

It is an object of the present invention to eliminate the disadvantages of the conventional control device and to provide a control device for a power-driven air pump for a car in which the revolution speed of a d.c. motor is changed depending on the quantity of air needed in such a manner that the control device operates the d.c. motor at a high speed when the density of air is low, e.g. at a low atmospheric pressure at highland, while it operates the d.c. motor at a low speed when the density of air is high at, for example, a low land.

The foregoing and the other objects of the present invention have been attained by providing a control device for a power-driven pump used for a car comprising a d.c. motor, an air pump driven by the d.c. motor and an exhaust device for reburning and purifying exhaust gas from an engine by actuating the air pump, characterized by comprising sensors for detecting quantity of air necessary to be fed into the exhaust device to purify the exhaust gas and a variable control device to variably control the revolution speed of the d.c. motor depending on the quantity of air.

A more complete appreciation of the invention and many of the attendant advantages thereof will be readily obtained as the same becomes better understood by reference to the following detailed description when considered in connection with the accompanying drawings, wherein.

A preferred embodiment of the present invention will be described with reference to FIG. 4 in which the same reference numerals as in FIG. 1 designate the same parts and description thereof will be omitted.

Figure 1:
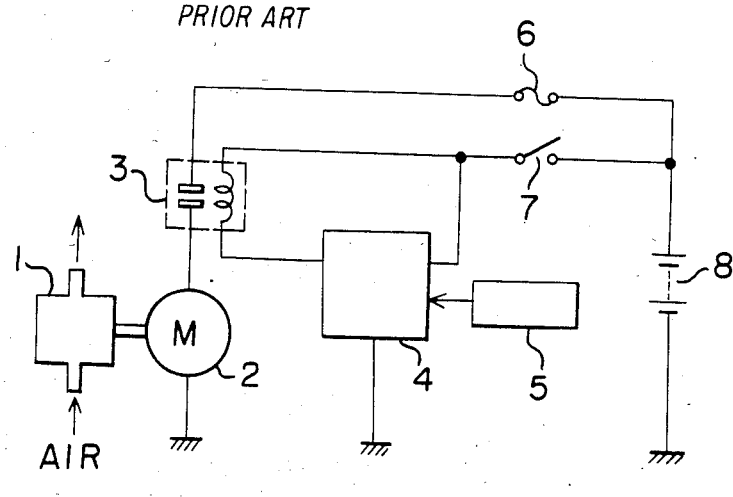
FIG. 1 is a schematic diagram of a control device of a conventional air pump for a car.
Figure 2:
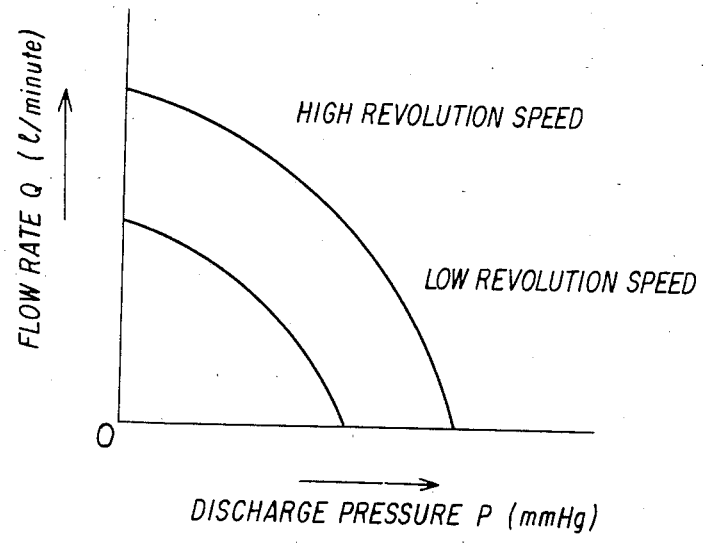
FIG. 2 shows a characteristic curve of flow rate vs discharge pressure of a multivane type motor-drive air pump.
Figure 3:
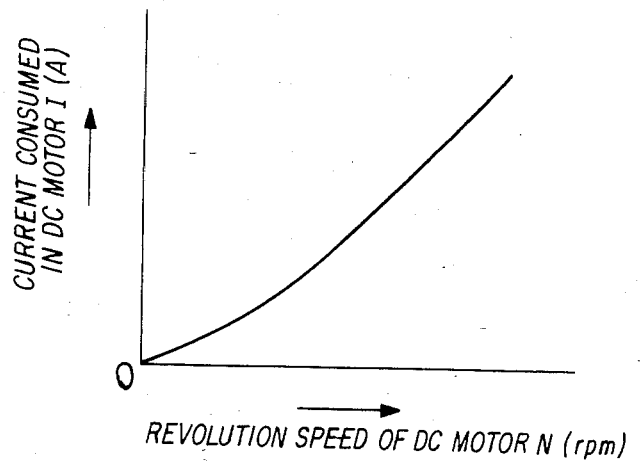
FIG. 3 shows a characteristic curve of number of revolution vs current consumed in a d.c. motor.
Figure 4:
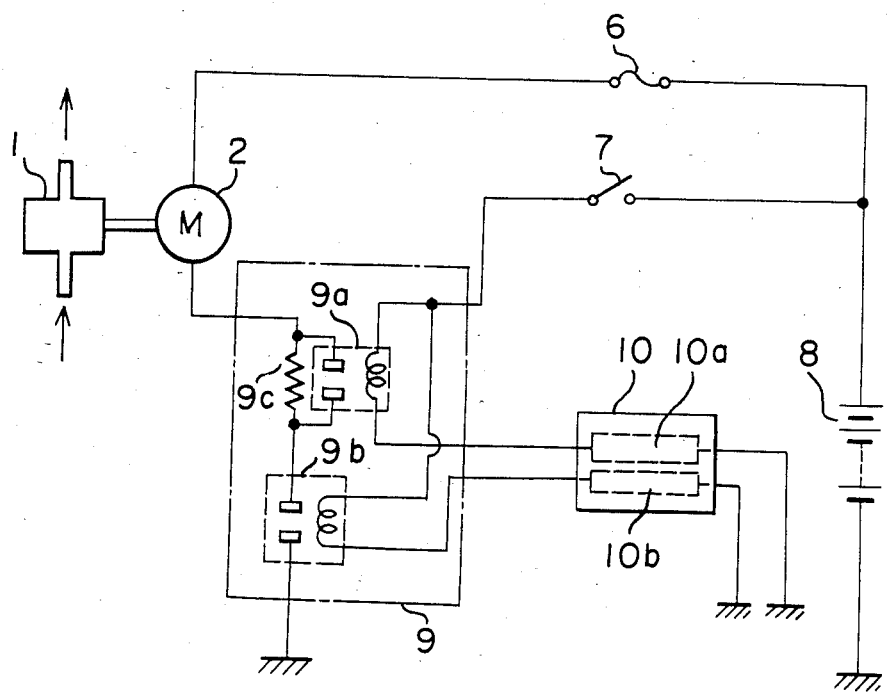
FIG. 4 is a schematic diagram of an embodiment of the control device for an air pump for a car according to the present invention.

In FIG. 4, a variable control device 9 comprises a relay 9a for high speed operation and a relay 9b for turning on or off which are serially connected. A resistor 9c is connected in parallel to the relay 9a for high speed operation. One of junctions of the relay 9a and the resistor 9c is connected to the d.c. motor 2 and a terminal of the relay 9b is grounded. A sensor section 10 includes two sensors 10a and 10b. The sensor 10a is to sense relatively high density of air to connect a circuit including the sensor itself to the ground. The sensor 10b is to sense relatively low density of air to connect a circuit including the sensor itself to the ground. Each of the sensors 10a, 10b is connected to a field coil for actuating each of relays 9a, 9b.

The operation of the control device having the construction above-mentioned will be described.

An engine is started by turning on the key switch 7. In this state, when a signal for low speed revolution is input from the sensor 10b to the variable control device 9, the coil for the relay 9b for turning on-off is excited to actuate the relay 9b. Owning to the resistor 9c connected in series to the relay 9b, the d.c. motor 2 is driven at a low speed to operate the air pump 1 at a small flow rate and the d.c. motor 2 is operated at small current consumption rate. When a car drives at a highland where the atmospheric pressure is low, the sensor 10a in the sensor section 10 operates to connect a circuit including the coil for the relay 9a for high speed operation to the ground. Accordingly, the d.c. motor 2 is driven at a high speed by the current flowing the relays 9a, 9b to thereby operate the air pump 1 at a high flow rate. When the secondary air is not needed, the variable control device 9 stops the d.c. motor 2, hence the air pump 1 is not operated.

In the embodiment described above, the revolution speed of the d.c. motor 2 is changed in two steps because of combination of two sets of relays 9a, 9b and the sensors 10a, 10b. However, further number of steps for changing speed can be attained by increasing the number of the relays and the sensors. Use of a large number of relays and sensors provides substantially continuously changing of revolution speed in a d.c. motor.

As the air pump 1, a multivane type air pump is taken as an example. However, the same effect can be obtained by using another type of air pump such as a diaphragm type, a piston type and so on. The control device according to the present invention attains the same effect to a case of burning atomized particles for a diesel engine besides the reburning of the exhaust gas.

Although description has been made as the control device utilizing relays, the same effect can be obtained by using semiconductors.

In accordance with the present invention, the following excellent advantages can be attained by operating an air pump stepwisely or continuously at low speed or a high speed depending on the quantity of air necessary to optimum operation. Namely, since a d.c. motor is operated at a low speed depending on circumstances, the consumption rate of current for the d.c. motor is reduced; durability of an air pump is improved; durability of the d.c. motor is improved; and generation of noises is reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A controlled device for a power driver D.C. motor air pump used for an exhaust device for automobiles which reburns and purifies exhaust gas emitted by the engine of said automobile comprising:

a plurality of air sensors;

means for sensing air quantity each having two terminals;

variable control means coupled to plurality of air sensors and said d.c. motor comprising:

at least two serially connected relays in which all of said relays, except for one, at the grounded side respectively, have parallel resistors and said plurality of air sensors corresponding in number to said relays, one terminal of each of said air sensors is connected to a field coil of each of said relays and the other terminal of said air sensor is grounded when said each sensor is actuated.

* * * * *